United States Patent
Kawasaki et al.

(10) Patent No.: US 9,143,639 B2
(45) Date of Patent: Sep. 22, 2015

(54) WIRELESS COMMUNICATION SYSTEM COMPRISING RECEIVER AND IMAGE TRANSMITTER AND WIRELESS COMMUNICATION METHOD THEREOF

(75) Inventors: Shinya Kawasaki, Sagamihara (JP); Koichi Niida, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 1308 days.

(21) Appl. No.: 12/977,731

(22) Filed: Dec. 23, 2010

(65) Prior Publication Data
US 2011/0090056 A1    Apr. 21, 2011

Related U.S. Application Data

(63) Continuation of application No. PCT/JP2009/060920, filed on Jun. 16, 2009.

(30) Foreign Application Priority Data

Jun. 30, 2008 (JP) .................................. 2008-170281

(51) Int. Cl.
*G05B 23/02* (2006.01)
*G08B 5/22* (2006.01)
(Continued)

(52) U.S. Cl.
CPC ............ *H04N 1/00347* (2013.01); *H04L 67/36* (2013.01); *H04N 1/00103* (2013.01);
(Continued)

(58) Field of Classification Search
CPC .......... H04N 1/00347; H04N 1/00103; H04N 7/185; H04L 67/36; H04L 12/58; H04L 67/306; H04L 29/12103; H04L 29/1216; H04L 61/1535; H04L 51/28; H04L 67/26; H04L 67/18; H04L 61/157; G06F 17/30539; G06F 17/30312; G06Q 30/0207; G06Q 30/0269; H04W 4/206; H04W 88/04; H04W 76/025; H04W 76/023; H04W 4/06; H04W 4/02; A61B 1/00016; A61B 1/00059; A61B 5/0002; A61B 1/00039; A61B 1/00154; A61B 1/0016; A61B 1/0052; A61B 1/00057; A61B 1/045; G02B 23/2484; G02B 23/24
USPC .............. 340/7.21, 7.46, 3.1, 870.03, 870.06, 340/870.18, 539.22, 572.4, 2.7, 3.3, 3.31, 340/3.23, 3.2, 3.21, 3.32, 3.42, 5.1, 5.32, 340/5.92, 10.1; 455/456.3, 63.4, 25, 334, 455/47, 502, 526, 418; 707/713, 731, 759; 714/752; 370/338, 310, 437, 432, 390, 370/349; 600/118, 106
See application file for complete search history.

(56) References Cited

U.S. PATENT DOCUMENTS

| 6,128,472 | A | 10/2000 | Harel et al. |
| 6,445,824 | B2 * | 9/2002 | Hieda .......................... 382/232 |

(Continued)

FOREIGN PATENT DOCUMENTS

| EP | 1879410 A1 | 1/2008 |
| GB | 2379358 A | 3/2003 |

(Continued)

OTHER PUBLICATIONS

Notification of Transmittal of Translation of the International Preliminary Report on Patentabililty (Form PCT/IB/338) of International Application No. PCT/JP2009/060920 mailed Feb. 17, 2011 with Forms PCT/IB/373 and PCT/ISA/237, 2681.

(Continued)

*Primary Examiner* — Ariel Balaoing
*Assistant Examiner* — Mancil Littlejohn, Jr.
(74) *Attorney, Agent, or Firm* — Westerman, Hattori, Daniels & Adrian, LLP

(57) ABSTRACT

Communication-identifier-assigned image data is transmitted via a set channel using the same as a communication identifier set for each image transmitter and a channel set in transmission. Then, a receiver which has received a plurality of image data items stores the received image data items, communication identifiers, and channels in such a manner that the received image data items are related to the communication identifiers and channels. Thumbnailed images in each image data item are displayed on one screen. When an image is selected from the thumbnailed images, an image transmitter that has transmitted the image is determined on the basis of the communication identifier and channel related to the selected image and is connected exclusively to the receiver. Images acquired from this time on are enlarged and displayed chronologically on a display section. The image transmitter and receiver constitute a wireless communication system.

10 Claims, 7 Drawing Sheets

(51) Int. Cl.
  *G08B 1/08* (2006.01)
  *H04N 1/00* (2006.01)
  *H04N 1/32* (2006.01)
  *H04N 1/327* (2006.01)
  *H04N 1/333* (2006.01)
  *H04W 76/02* (2009.01)
  *H04L 29/08* (2006.01)

(52) U.S. Cl.
  CPC ....... *H04N1/00108* (2013.01); *H04N 1/00442* (2013.01); *H04N 1/00448* (2013.01); *H04N 1/00461* (2013.01); *H04N 1/32005* (2013.01); *H04N 1/32016* (2013.01); *H04N 1/32037* (2013.01); *H04N 1/32058* (2013.01); *H04N 1/32069* (2013.01); *H04N 1/32117* (2013.01); *H04N 1/32771* (2013.01); *H04N 1/32776* (2013.01); *H04N 1/32791* (2013.01); *H04N 1/33361* (2013.01); *H04N 1/33392* (2013.01); *H04W 76/021* (2013.01); *H04N 2201/0015* (2013.01); *H04N 2201/0036* (2013.01); *H04N 2201/0041* (2013.01); *H04N 2201/0055* (2013.01); *H04N 2201/0079* (2013.01); *H04N 2201/0086* (2013.01); *H04N 2201/0087* (2013.01); *H04N 2201/0089* (2013.01); *H04N 2201/3205* (2013.01); *H04N 2201/3274* (2013.01); *H04N 2201/3276* (2013.01); *H04N 2201/3278* (2013.01); *H04N 2201/33342* (2013.01); *H04N 2201/33357* (2013.01)

(56) References Cited

U.S. PATENT DOCUMENTS

| | | | | |
|---|---|---|---|---|
| 7,415,282 | B2* | 8/2008 | Tillet et al. | 455/509 |
| 7,485,091 | B2* | 2/2009 | Abe | 600/109 |
| 8,068,700 | B2* | 11/2011 | Tsunekawa et al. | 382/299 |
| 2005/0100037 | A1 | 5/2005 | Burbidge et al. | |
| 2005/0174975 | A1 | 8/2005 | Mgrdechian et al. | |
| 2006/0217591 | A1* | 9/2006 | Abe | 600/118 |
| 2007/0047505 | A1* | 3/2007 | Wassingbo | 370/338 |
| 2007/0191028 | A1 | 8/2007 | Hinckley et al. | |
| 2007/0287384 | A1 | 12/2007 | Sadri et al. | |
| 2008/0051033 | A1 | 2/2008 | Hymes | |
| 2008/0123645 | A1* | 5/2008 | Pichna et al. | 370/390 |
| 2008/0307458 | A1* | 12/2008 | Kim et al. | 725/38 |

FOREIGN PATENT DOCUMENTS

| | | |
|---|---|---|
| JP | 1-243778 A | 9/1989 |
| JP | 3223438 B2 | 10/2001 |
| JP | 2004-215158 A | 7/2004 |
| WO | 01-59551 A2 | 8/2001 |
| WO | 2007-125428 A2 | 11/2007 |

OTHER PUBLICATIONS

International Search Report of PCT/JP2009/060920, mailing date Sep. 29, 2009.

European Search Report dated Nov. 9, 2011, issued in corresponding European Patent Application No. 09773292.9.

* cited by examiner

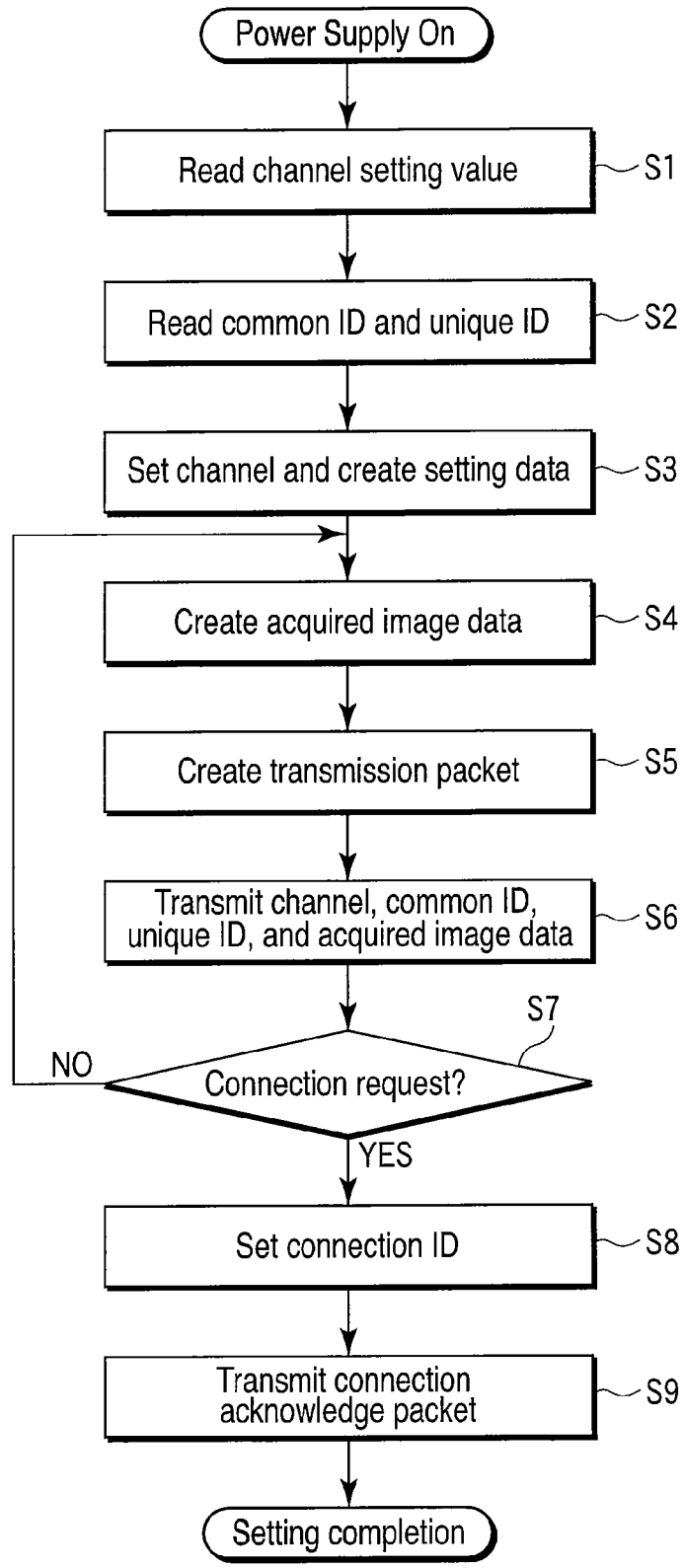
F I G. 2

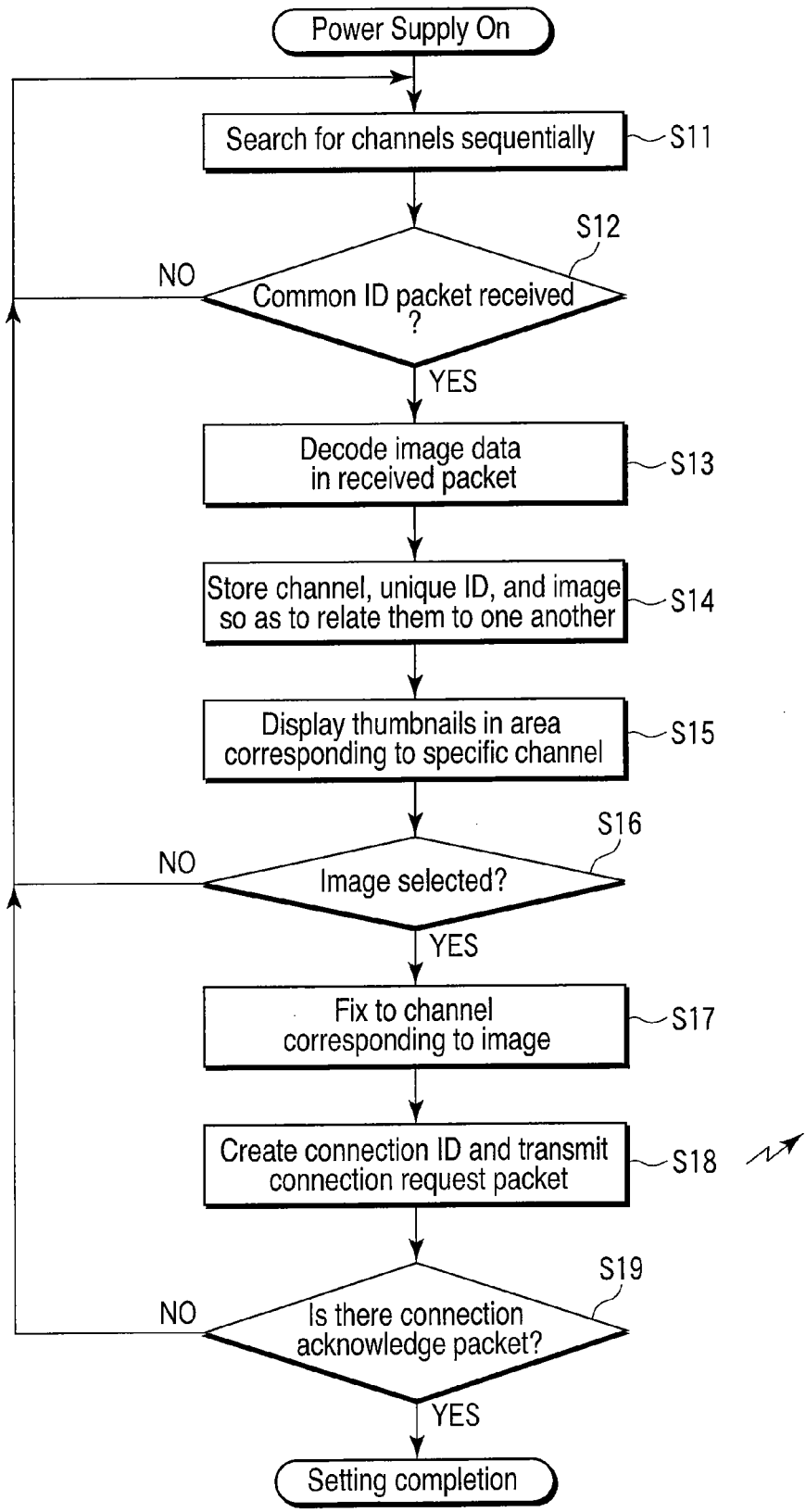
F I G. 3

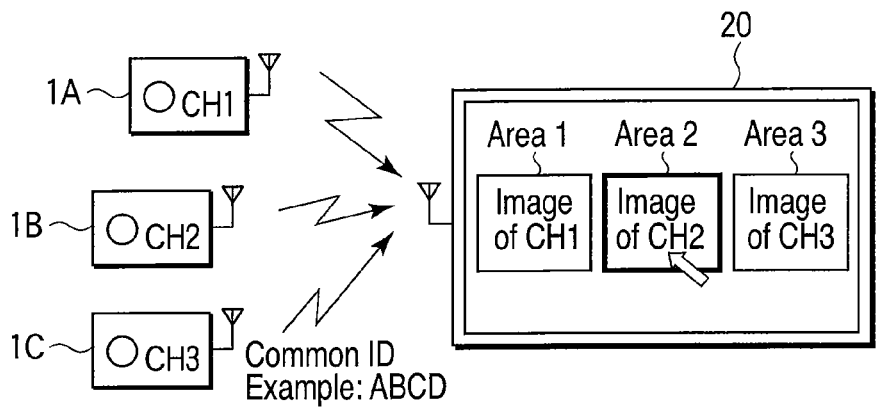
F I G. 4A
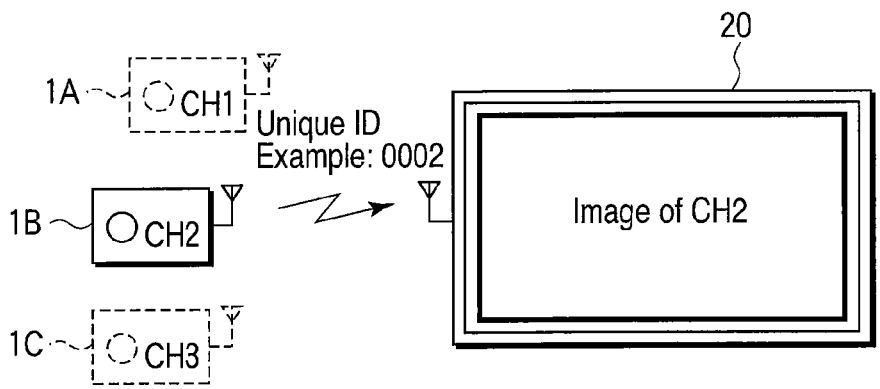
F I G. 4B
| Channel | Common ID | Unique ID | Image display position |
|---------|-----------|-----------|------------------------|
| CH1 | ABCD | 0001 | Area 1 |
| CH2 | ABCD | 0002 | Area 2 |
| CH3 | ABCD | 0003 | Area 3 |
F I G. 5

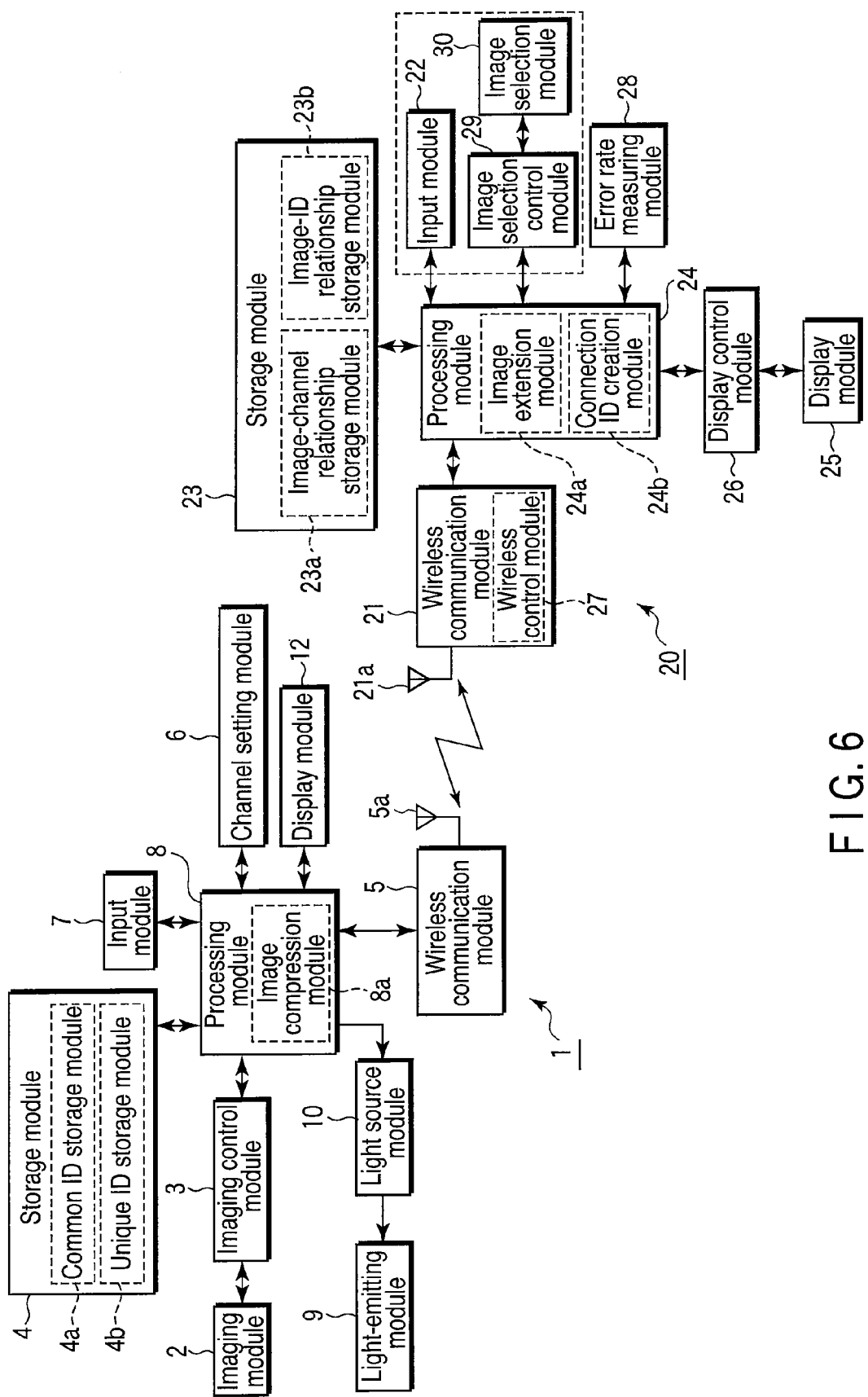
F I G. 6

WIRELESS COMMUNICATION SYSTEM COMPRISING RECEIVER AND IMAGE TRANSMITTER AND WIRELESS COMMUNICATION METHOD THEREOF

CROSS REFERENCE TO RELATED APPLICATIONS

This is a Continuation Application of PCT Application No. PCT/JP2009/060920, filed Jun. 16, 2009, which was published under PCT Article 21 (2) in Japanese.

This application is based upon and claims the benefit of priority from prior Japanese Patent Application No. 2008-170281, filed Jun. 30, 2008, the entire contents of which are incorporated herein by reference.

BACKGROUND OF THE INVENTION

1. Field of the Invention

This invention relates to a wireless communication system which comprises a receiver and an image transmitter that selectively connect with each other using IDs and a wireless communication method thereof.

2. Description of the Related Art

Generally, a wireless communication system is included a receiver and a transmitter. When communication is performed between them, the transmitter and receiver tune in to a communication frequency, thereby being connected to each other, which enables them to exchange communication data with each other. In wireless communication equipment, a frequency band to may be used has been specified according to the type, permission, or the like. Therefore, in the band, a considerable number of wireless devices are used and a desired called party is selected using various methods. One method is to exchange IDs with each other, call the selected receiver, and connect with the receiver.

In the wireless communication using IDs, there is a wireless communication system where image data is transmitted by wireless and the image is reproduced and displayed on the receiver side. In this system, when a transmitter and a receiver are connected by wireless, the channel (communication frequency) and identification number: ID (e.g., network ID) of the transmitter are caused to coincide with those of the receiver.

In a general connection method, a wireless device is provided with a channel switch and an ID switch and communication setting is done by causing the channel and ID to manually coincide with the channel and ID of the called party. In this connection method, both the channel switch and ID switch are operated manually by the communicator, making the connection setting complicated. As a method of simplifying the connection setting, a communication method disclosed in Japanese Patent No. 3223438 has been proposed. Japanese Patent No. 3223438 has disclosed a medical monitoring device used in monitoring electrocardiograms, respiration data, and the like of a subject on a digital telemeter.

BRIEF SUMMARY OF THE INVENTION

According to an embodiment of the present invention, there is provided an receiver comprising: an image reception section which receives an image transmitted from at least one image transmitter that has the same as a communication identifier on a wireless network; a display section which displays an image transmitted from the image transmitter; a storage section which stores information on the correspondence relationship between a channel used in transmitting the image from the image transmitter and the transmitted image; an image selection section which selects one from the transmitted images displayed in thumbnailed form; and a first display control section which selects a channel used in transmitting an image selected by the image selection section on the basis of information on the correspondence relationship between the channel stored in the storage section and the transmitted image and causes the display section to chronologically display the images transmitted chronologically from the image transmitter via the channel.

Advantages of the invention will be set forth in the description which follows, and in part will be obvious from the description, or may be learned by practice of the invention. Advantages of the invention may be realized and obtained by section of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 2 is a flowchart to explain a transmission operation on the image transmitter side;

FIG. 3 is a flowchart to explain a reception operation on the receiver side;

FIG. 4A shows a state of images before the image transmitters and receiver are connected;

FIG. 4B shows a state of images after the image transmitters and receiver are connected;

FIG. 5 is a table showing the relationship between channels on which image data is displayed, common IDs, unique IDs, and display positions on a screen;

FIG. 6 is a block diagram showing a configuration of a wireless communication system according to a first modification of the first embodiment;

DETAILED DESCRIPTION OF THE INVENTION

Hereinafter, referring to the accompanying drawings, embodiments of the invention will be explained in detail.

Figure 1:
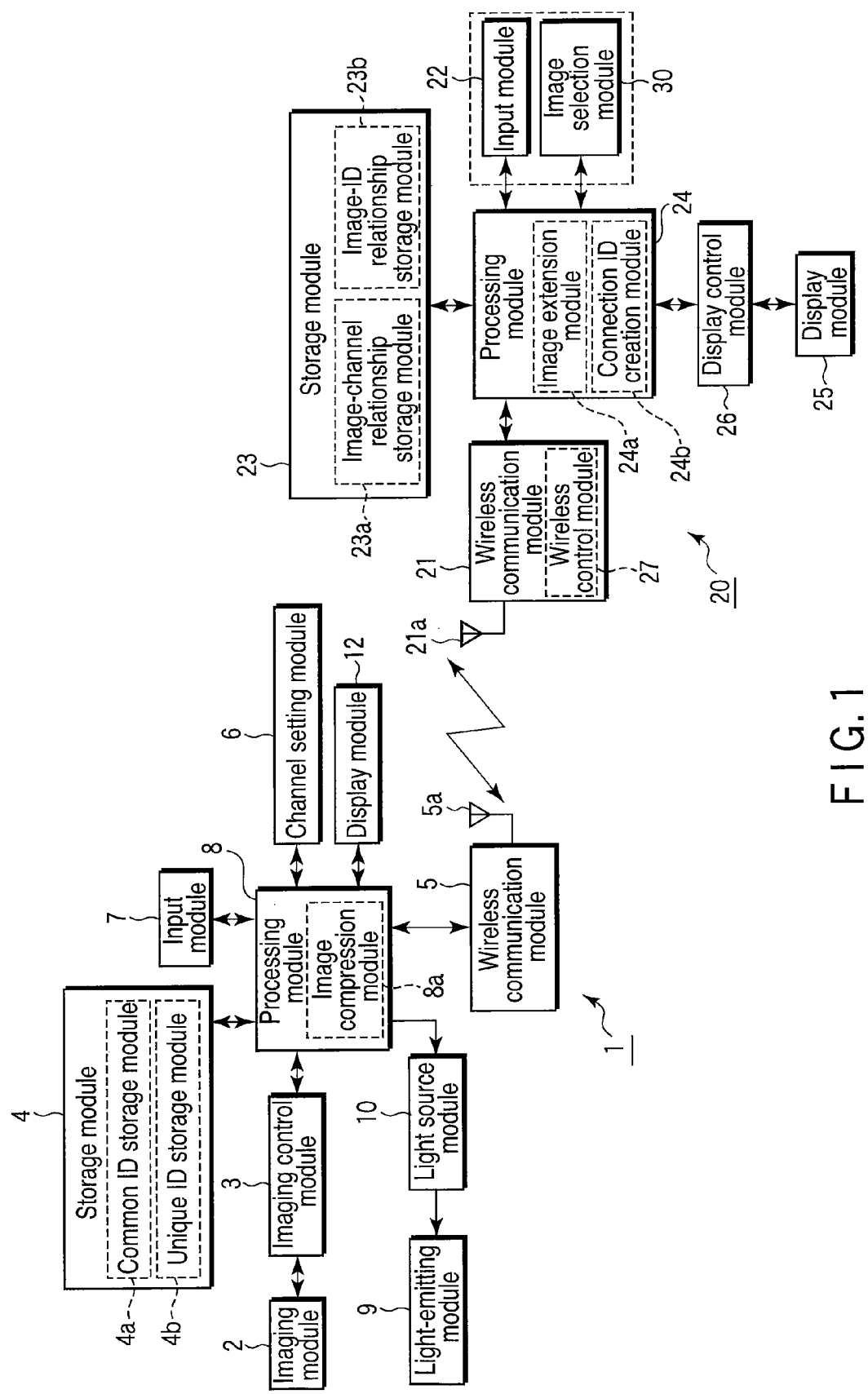
FIG. 1 is a block diagram showing a configuration of a wireless communication system according to a first embodiment of the invention.

FIG. 1 is a block diagram showing a configuration of a wireless communication system according to a first embodiment of the invention. This system comprises a plurality of image transmitters 1 which perform wireless communication in network form and a receiver 20. Use of only one image transmitter 1 and one receiver 20 is a representative example of the system.

The image transmitter 1 comprises an imaging module (module: section) 2 which forms an image of a subject at an arbitrary field angle by zooming, an imaging control module 3 which controls the imaging module 2, a storage module 4 which stores acquired image data, predetermined communication identifiers (IDs), and the like, a wireless communication module 5 which transmits and receives image data by wireless via an antenna 5a, a channel setting module 6 which sets a wireless communication channel (or communication frequency), an input module 7 which takes in an external instruction, a processing module 8 which controls various component parts to process data, a light-emitting module 9 which applies light when the subject is dark (at low luminance), a light source module 10 which drives the light-emitting module 9, and a display module 12 which displays acquired images and various pieces of information, including operator guidance and others. The storage module 4 further includes a common ID storage module 4a which stores a common ID for connecting with the receiver 20 for communication and a unique ID storage module 4b which stores a unique ID (e.g., a serial number or a MAC address) for each image transmitter. The processing module 8 further includes an image compression module 8a which compresses acquired image data.

The receiver 20 comprises a wireless communication module 21 which transmits and receives data by wireless via an antenna 21a, an input module 22 which takes in an external instruction, a storage module 23 which stores data, a processing module 24 which processes data, a display module 25 which displays data, a display control module 26 which controls a display operation of the display module 25, and an image selection module 30 which selects an image to be displayed.

The storage module 23 further includes an image-channel relationship storage module 23a which stores received image data and a reception channel so as to relate them to each other and an image-ID relationship storage module 23b which stores received image data and an ID so as to relate them to each other.

The processing module 24 further includes an image extension module 24a which extracts a compressed image from the received image data, extends the image, and outputs the reproduced image and a connection ID creation module 24b which creates a connection ID on the basis of a unique ID.

A communication control module 27 is provided in the wireless communication module 21. The communication control module 27 selects the channel used in transmitting a thumbnail image selected by the user or an image selection module 30 on the basis of information on the correspondence relationship between the reception channel and related image data from the image-channel relationship storage module 23a and connects the image transmitter 1 using the channel exclusively with the receiver 20 in a one-to-one correspondence, thereby establishing two-way communication. In the two-way communication, the receiver 20 extends images transmitted chronologically from the image transmitter 1 to reproduce the images and displays the reproduced images chronologically on the display module 25. The image selection module 30 is an input device, such as a mouse or a touch panel, for enabling the user to select a desired image.

Next, communication setting will be explained with reference to a flowchart for the image transmitter side shown in FIG. 2 and a flowchart for the receiver side shown in FIG. 3. FIG. 4A shows a state of images before the image transmitters 1A, 1B, 1C and receiver 20 are connected. FIG. 4B shows a state of images after the image transmitters 1A, 1B, 10 and receiver 20 are connected. FIG. 5 is a table showing the relationship between channels on which image data is displayed, common IDs, unique IDs, and areas 1, 2, and 3 which are display positions on a screen.

First, when the power supply of one 1A of a plurality of image transmitters in a communication area is turned on and activated, transmitter 1A goes into the setting mode, and acquires an already set channel setting value (e.g., CH1) from the channel setting module 6 (step S1). Image transmitter 1A further reads a common ID and a unique ID from the storage module 4 (step S2) and combines the common ID and unique ID with the channel setting value to create setting data (step S3).

Thereafter, the imaging module 2 acquires the subject, thereby creating acquired image data. The acquired image data is compressed at the image compression module 8a of the processing module 7 (step S4). In addition, the processing module 8 creates a transmission packet from the setting data and compressed image data and sends the packet to the wireless communication module 5 (step S5). The wireless communication module 5 subjects the transmission packet to specific modulation and radiates the resulting packet from the antenna 5a toward the receiver 20 (step S6).

As shown in FIG. 4A, two image transmitters 1B, 10 exist in the communication area in addition to image transmitter 1A. The image transmitters 1B, 10 radiate channels, common IDs, unique IDs, and image data in the form of transmission packets toward the receiver 20 in the same manner as described above.

Hereinafter, the operation of the receiver side will be explained with reference to the flowchart of FIG. 3. Before connecting with the image transmitters 1A, 1B, 10, the power supply of the receiver 20 is turned on, the receiver 20 goes to the setting mode and searches for reception channels sequentially (step S11). When the transmission packets radiated from the image transmitters 1A, 1B, 1C on a predetermined channel are received by the antenna 21a, each signal demodulated by the wireless communication module 21 is extracted and it is determined whether a packet including a common ID has been received (step S12). If the packet is image data from which the common ID has been detected (YES), the image data is handed to the processing module 24.

In the processing module 24, the image extension module 24a extends the image and decodes the image as image data (step S13).

The decoded image data is related to the reception channel setting value and unique ID and then stored in the storage module 23 (step S14). That is, as shown in FIG. 5, the channel on which the image data is displayed, common ID, unique ID, and areas 1, 2, 3 serving as display positions on the screen are related to one another.

Then, as shown in FIG. 4A, for the display control module 26 to provide a thumbnail display (or to display minified images) on a channel basis, the received image data is downscaled at the processing module 24 and displayed on the display module 25 (step S15). On the thumbnail display screen, the received image is updated and displayed in real time or at predetermined time intervals on an image transmitter basis or a channel basis until an image is selected. In addition, while on the thumbnail display screen of FIG. 4A, the image has been displayed on a channel basis, the display of the image may be changed on a common ID basis or the image may be displayed in more detail on the basis of a combination of a channel and a common ID.

Next, it is determined whether an image has been selected (step S16). In this determination, when the input module 22 has been operated by the user and a desired image, such as channel CH2 in the middle of the screen, has been selected (YES), the screen is fixed to the channel (CH2) stored in the image-channel relationship storage module 23a (step S17) and the screen of the receiver 20 is occupied by a screen of channel CH2 as shown in FIG. 4B. While in the first embodiment, the display screen has been occupied by an image on one channel, the invention is not limited to this. For instance, a more minified thumbnail display screen of unconnected image transmitters may be displayed in the corner of the screen. For example, a screen change switch may be provided in the input module 22 and a thumbnail display screen may be redisplayed on the screen if needed.

By this selection operation, the connection ID creation module 24b creates a connection ID from the unique ID and transmits the connection ID to image transmitter 1B and waits for a message about whether a connection acknowledge packet has been received (step S18). While in the first embodiment, the connection ID has been created from the unique ID (connection ID=unique ID), the invention is not limited to this. The connection ID may be created from an arbitrary ID other then the unique ID.

Hereinafter, the operation of the image transmitter side will be further explained with reference to the flowchart of FIG. 2.

The image transmitter 1 determines whether it has received a connection request ID packet from the receiver 20 (step S7). If having received a connection request ID packet (YES), the image transmitter 1 sets the unique ID as a connection ID (step S8) and transmits a connection acknowledge packet to the receiver 20 (step S9). Then, the receiver 20 side shown in FIG. 3 checks that the connection acknowledge packet has been received (step S19) and the connection of the desired one 1 of the thumbnailed image transmitters with the receiver 20 is completed. As a result of the transmission and reception, an ID is shared by the image transmitter 1 and receiver and is valid only between them, followed by the start of subsequent communication.

In the process of checking a connection request, steps S7 to S9 and steps S18 and S19 may be omitted. That is, a connection request from the receiver 20 to the image transmitter 1 is omitted and the selected image is enlarged at the display module, thereby making the system much simpler.

With the wireless communication system of the first embodiment configured as described above, when the user only selects a desired image, while looking at a plurality of simplified images on the display screen on the receiver side, the receiver is connected exclusively with the image transmitter that is transmitting the desired image, enabling the user to obtain a more detailed image. Accordingly, the user need not perform setting by inputting alphanumeric characters, including an ID that relates the display screen to the image transmitter, which completes the connection setting easily and reliably. In addition, the user only selects a desired screen on the receiver side, which prevents an image transmitter from being selected erroneously due to improper ID input as in the conventional art.

Next, a first modification of the first embodiment will be explained.

FIG. 6 shows a configuration of the first modification. The same component parts of the first modification as those of FIG. 1 described above are indicated by the reference numbers and an explanation of them will be omitted. The configuration of the first modification is such that an error rate measuring module 28 which measures the error rate of an image and an image selection control module 29 are added to the receiver 20 configured according to the first embodiment.

As a result of the deterioration of wireless condition (or radio wave environment), the error rate of data received on the selected channel might increase and exceed the upper limit (a predetermined value) of a preset error rate, leading to an improper display state. The wireless condition deteriorates when the image transmitter 1 moves in a communication area, when a device, such as a high-frequency power supply acting as a driving source of another unit, is arranged between the image transmitter and receiver 20 or near the receiver 20, or when the same channel is used.

The image selection control module 29 performs control so as to switch an image improperly displayed to another image. In selection control, the image selection control module 29 instructs the image selection module 30 again to display a channel selection screen in thumbnailed form, informs the user of the switching of screens, and then switches the screen to a thumbnail display screen. Of course, when having determined that the display state has become worse, the user may switch the screen to the thumbnail display screen and select a desired image from the thumbnail display.

Next, a second modification of the first embodiment will be explained.

Figure 7:
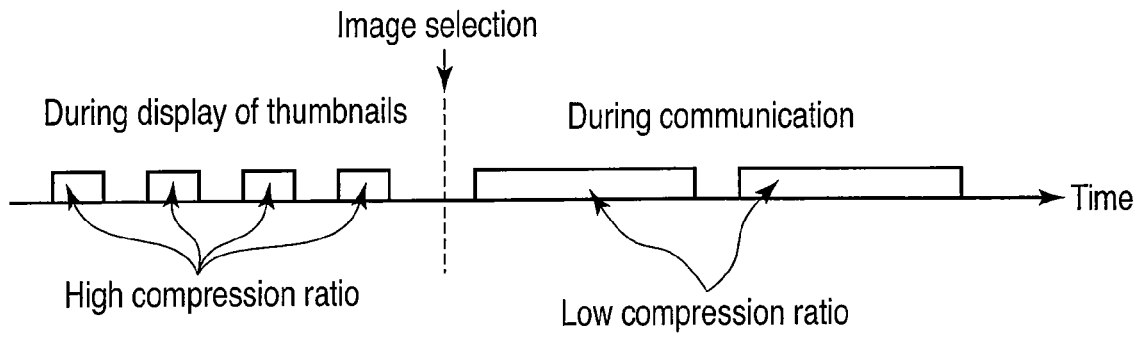
FIG. 7 shows a reception state of image data at a receiver according to a second modification of the first embodiment.

FIG. 7 shows a reception state of image data at the receiver 20. In the third modification, when the display module 25 of the receiver 20 displays a channel selection screen in thumbnailed form, the image transmitter 1 transmits an image whose compression ratio is high to the receiver 20. After the connection for two-way communication whereby an image has been selected has been completed, the image transmitter 1 transmits an image whose compression ratio is low to the receiver 20.

After the connection has been completed, the processing module 24 of the receiver 20 instructs the processing module 8 of the image transmitter 1 to change the compression ratio via the wireless communication module 21 and wireless communication module 5. After having received the instruction, the image transmitter 1 creates image data with a decreased compression ratio and transmits the created data to the receiver 20. As described above, the processing module 24 gives an instruction to change the compression ratio.

As described above, communication is performed with images whose compression ratio is high when images on a plurality of small screens are communicated and communication is performed with images whose compression ratio is low when one selected image is displayed so as to fill the entire screen, which reduces the communication load on the image transmitter 1 and receiver 20 and enables a high-quality image to be displayed.

Figure 8:
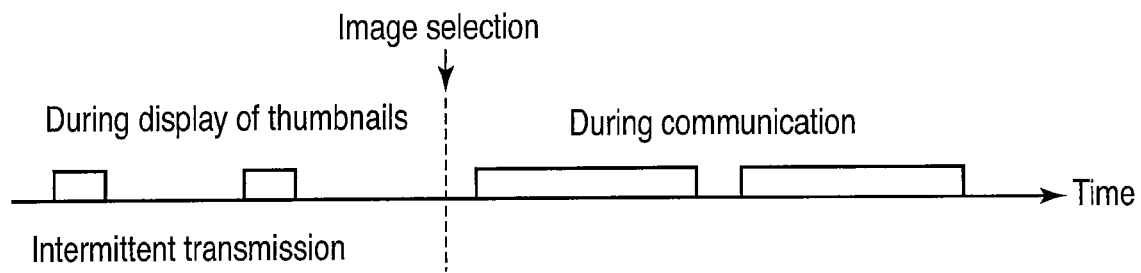
FIG. 8 shows a reception state of image data at a receiver according to a third modification of the first embodiment.

Next, a third modification of the first embodiment will be explained. FIG. 8 shows a reception state of image data at the receiver 20.

In the third modification, when a channel selection screen is displayed in thumbnailed form as shown in FIG. 4A, the wireless communication module 5 of the image transmitter 1 does not update the thumbnail display in real time and the image transmitter 1 transmits images intermittently, thereby causing the display module 25 of the receiver 20 to display a still image updated at regular intervals of time at all the transmitters or at preset intervals of time at each transmitter side.

After the connection whereby an image has been selected has been completed, one image displayed so as to fill the entire screen is displayed in real time without intermission. As described above, in a thumbnail display that has to display all the images transmitted to a plurality of image transmitters, an increase in the processing load can be alleviated.

Next, a fourth modification of the first embodiment will be explained.

In the fourth modification, when the user has selected one of the thumbnails on the channel selection screen displayed by the display module 25 of the receiver 20, the display control module 26 displays the unselected thumbnails in the corner of the screen of the display module 25 in such a manner that they are reduced in size in a recognizable range. The selected image is enlarged from the thumbnail size so as to fill a main display area. When a reduced-size thumbnail has been selected, the thumbnail image is replaced with the currently displayed main image and enlarged.

According to the fourth modification, since the selected image is enlarged and displayed in the middle of the screen and the unselected thumbnails transmitted from the image transmitter are also displayed in a recognizable size, the user can change the present image to a desired one by just selecting a thumbnail displayed in the corner of the screen even if the user does not return to the channel selection screen when changing screens.

Next, a second embodiment of the invention will be explained with reference to FIG. 9.

Figure 9:
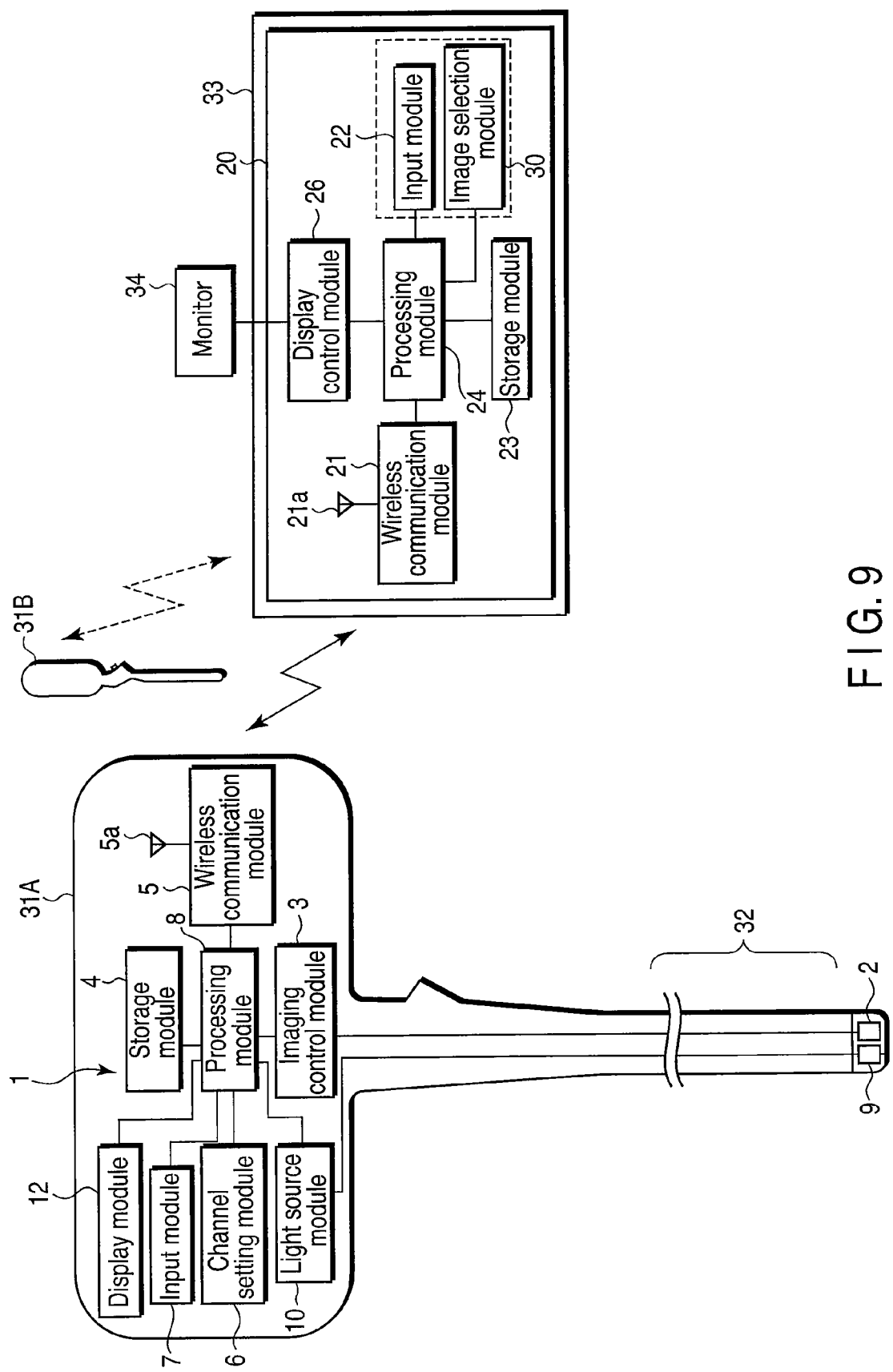
FIG. 9 shows a configuration of an endoscopic instrument provided with a wireless communication system according to a second embodiment of the invention.

FIG. 9 shows as the second embodiment an endoscopic instrument system to which a wireless communication system composed of an image transmitter and a receiver according to the first embodiment and the modifications of the first embodiment have been applied. In the second embodiment, the same component parts as those of FIG. 1 are indicated by the same reference numbers and an explanation of them will be omitted.

The endoscopic instrument system comprises a plurality of endoscope bodies 31A, 31B, an instrument body 33, and a monitor 34. In the endoscopic instrument of the second embodiment, an image transmitter is provided in each of the endoscope bodies 31, 31B and a receiver 20 is provided in a processor unit (endoscopic instrument body) 33. Image data and control signals are transmitted and received by wireless communication.

At the tip of a bendable insertion module 32 of each of the endoscope bodies 31A, 31B, an imaging module 2 composed of an image pickup device and a light-emitting module 9 composed of a light-emitting diode (LED) are provided. Hereinafter, explanation will be given, taking the endoscope body 31A as an example.

On the rear anchor side of the endoscope body 31A, an image transmitter 1 configured as described above is provided. Although all the component parts of the image transmitter 1 are provided, the necessity minimum component parts may be provided as needed. For instance, the channel setting module 6 and input module 7 may be a switch that is also used as an operation dial for causing the insertion module 32 to bend. The display module also be used as a module that displays other operation instructions or parameters.

The endoscope body 31A is such that the insertion module 32 is inserted into a subject and the imaging module 2 photographs the body cavity illuminated with the light-emitting module 9. Image data on a lesion or the like photographed by the imaging module 2 is subjected to processes, including compression, at the processing module 8. Then, the resulting data is converted into a wireless signal, which is then radiated from the antenna 5*a*.

The processor unit 33 comprises at least the receiver 20 and the monitor 34 which displays photographed images, data on the images, device status, operator guidance, and others. The monitor 34 is also used as the display module 25 of the receiver 20.

In the processor unit 33, the antennal 21*a* receives the compressed image data transmitted by wireless from the wireless communication module 5, the processing module 24 reproduces images by extending them, and the resulting images are displayed on the monitor 34.

As described above, with an endoscopic instrument to which the wireless communication system of the invention has been applied, the operator completes the connection setting by selecting a desired image, while looking at an image acquired by the endoscope body 31A at hand. Therefore, the operator can make connections easily and reliably without taking ID, and others into account. Furthermore, since communication is performed by wireless, there is no signal cable that connects the endoscope body and the instrument body, increasing the freedom of movement in the endoscope body, which improves the movement of the operator remarkably, makes the operation easier, and therefore decreases the degree of fatigue.

According to the present invention, it is possible to provide a wireless communication system comprising a receiver and an image transmitter which have a communication setting function of enabling the image transmitter and receiver to be connected to each other easily and reliably and a wireless communication method thereof.

The embodiments described above include the following inventions:

(1) A wireless communication system characterize by comprising:

imaging section which acquires a subject in an imaging range arbitrarily changed at hand;

an image transmitter which includes compression section that compresses acquired image data obtained by the imaging section, first wireless communication section that transmits and receives data, and setting section that sets a communication channel;

a receiver which includes second wireless communication section that transmits and receives data, first display section which causes the second wireless communication section to receive the acquired image data and displays the data in thumbnailed form for each setting of the image transmitter, extension section which extends the acquired image data, and selection section which selects an image displayed by the first display section, wherein the receiver includes storage section which stores information on the correspondence relationship between the acquired image data and setting values by the setting section, and second display section which displays only acquired image data received from a specific image transmitter on the basis of the result of selection at the selection section and the contents stored in the storage section.

(2) The second wireless communication section written in item (1) further includes error rate measuring section which measures the error rate of the received data in the middle of displaying the acquired image data on the second display section and performs control so as to display the data on the first display section when the error rate is larger than a specified value.

(3) The extension section written in item (1) or item (2) thins the acquired image data and displays the thinned data when displaying on the first display section and displays the data without thinning the data when displaying on the second display section.

(4) The compression section written in item (1) or item (3) increases the compression ratio when displaying on the first displaying section written in item (1) or item (2) and decreases the compression ratio when displaying on the second display section.

(5) The first wireless communication section written in item (1) or item (3) transmits the acquired image data intermittently when displaying on the first display section.

(6) A wireless communication system characterized by comprising:

a plurality of image transmitters each of which comprises an imaging module that forms an image of a subject at an arbitrary field angle and acquires the image, a storage module that stores a common and a unique communication identifier assigned to the image data acquired by the imaging module, a channel setting module that sets a wireless communication channel, a first wireless communication module that transmits the communication-identifier-assigned image data by wireless in the form of packets on a set channel and each of which transmits data using a different channel; and a receiver which comprises a second wireless communication module that receives image data certified on the basis of the common communication identifier from the image data transmitted by wireless from the image transmitters, a storage module that stores a connection identifier on the basis of the received image data and the unique communication identifier, the channel used in communication for each of the image transmitters, and an area where the image data is displayed on a screen so as to relate them to one another, a display module that displays each image read from the storage module and thumbnailed on a screen, an image selection module that selects at least one of the thumbnailed images displayed on the display module, and a communication control module that enlarges the selected image as a main image on the display module and selects an image transmitter to be connected exclusively in two-way communication on the basis of the connection identifier assigned to the image and the channel used.

According to an embodiment of the present invention, there is provided a receiver, when the user selects a desired image, while looking at a plurality of images displayed in thumbnailed form on the display screen, the receiver is connected exclusively to an image transmitter that is transmitting the image on the basis of a communication identifier assigned to the image and a channel used in communication and further a detailed image is transmitted to the receiver. Accordingly, the user completes the procedure for connecting with the transmitter by selecting an image displayed in thumbnailed form, which prevents an erroneous selection due to improper input.

According to an embodiment of the present invention, there is provided a image transmitter, a communication identifier is assigned to acquired image data and the resulting image is transmitted to the receiver by use of one selected from the preset channels. The receiver side can identify the image transmitter that has transmitted the data from the communication identifier assigned to the image data and the channel used in communication even under a communication environment where a plurality of transmitters transmit data.

According to an embodiment of the present invention, there is provided a wireless communication system, on the basis of a communication identifier set for each image transmitter and a channel set in transmission, the communication-identifier-assigned image data is transmitted via the set channel. A receiver which has received such image data items stores the communication identifiers and channels in such a manner that the identifiers and channels are related to the image data, thereby causing thumbnailed images of the individual image data items to be displayed on one display screen. When one thumbnailed image is selected, the image transmitter that has transmitted the image is determined from the communication identifier and channel related to the selected image. Then, the receiver is connected exclusively to the image transmitter, thereby enlarging images acquired from this time on and displaying the enlarged images on a display module in chronologic order. Only the selection of an image by the user enables the receiver to connect with the image transmitter.

According to an embodiment of the present invention, there is provided a wireless communication method, since a communication identifier has been assigned to image data transmitted from the image transmitter and the channel used in transmission has been related to the image data, when a plurality of image data items are received and displayed on the display screen and at least one of the images is selected, the image transmitter that has transmitted the image is determined on the basis of the communication identifier and channel related to the selected image, which makes it possible to connect with the image transmitter. Accordingly, what is required for the user to connect with the image transmitter is only to select an image.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A receiver comprising:
   an image reception section which receives an image transmitted from at least one image transmitter that has the same communication identifier on a wireless network;
   a display section which displays an image transmitted from the image transmitter;
   a storage section which stores information on a correspondence relationship between a channel used in transmitting the image from the image transmitter and the transmitted image;
   an image selection section which selects one from the transmitted images displayed in thumbnailed form; and
   a first display control section which selects a channel used in transmitting an image selected by the image selection section on the basis of information on the correspondence relationship between the channel stored in the storage section and the transmitted image and causes the display section to chronologically display the images transmitted chronologically from the image transmitter via the channel; and
   a first communication control section which selects the channel used in transmitting the image selected by the image selection section on the basis of information on the correspondence relationship between the channel stored in the storage section and the transmitted image and establishes two-way communication with the image transmitter in a one-to-one correspondence via the channel,
   wherein the image reception section receives the image before and after the two-way communication is established, wirelessly receives the image intermittently in an imaged order until the two-way communication is established, transmits a communication connection request to the image transmitter which transmits the image selected by the image selection section in a state where the two-way communication is not established, and wirelessly receives the image non-intermittently and chronologically after the two-way communication is established in response to the communication connection request.

2. The receiver according to claim 1, further comprising: an instruction section which instructs the image transmitter that has established the two-way communication to transmit an image whose compression ratio has been changed.

3. The receiver according to claim 1, further comprising: a second display control section which causes the display section to display the transmitted image in a display area differing according to each of the channels on the basis of information on the correspondence relationship between the channel stored in the storage section and the transmitted image until the image is selected.

4. The receiver according to claim 1, further comprising: a third display control section which selects the channel used in transmitting the image selected by the image selection section on the basis of information on the correspondence relationship between the channel stored in the storage section and the transmitted image and makes larger a display area of the images transmitted chronologically from the image transmitter via the channel than an image received via one other channel and causes the display section to display the resulting images.

5. The receiver according to claim 1, further comprising: a fourth display control section which thins the transmitted images and causes the display section to display the resulting images until the image is selected.

6. The receiver according to claim 1, further comprising: a fifth display control section which causes the display section to chronologically display only the images transmitted via the selected channel.

7. An image transmitter comprising:
an imaging section which repeats imaging; and
a wireless communication section which wirelessly transmits image data created by the imaging section to a receiver that has a same communication identifier on a wireless network,
wherein the wireless communication section wirelessly transmits the image data intermittently in an imaged order before two-way communication is established with the receiver in a one-to-one correspondence, and, when a communication connection request is received from the receiver in a state where the two-way communication is not established, wirelessly transmits the image data non-intermittently and chronologically after the two-way communication is established with the receiver in response to the received communication connection request.

8. A system comprising:
a wireless endoscopic instrument which comprises
an illumination section which illuminates a subject,
an imaging section which photographs the subject,
an image transmitter which comprises an image transmitting section which transmits an image to a receiver that has the same communication identifier on a wireless network, a second communication control section which establishes two-way communication with the receiver in a one-to-one correspondence, and a transmission control section which transmits the image intermittently to the image transmitting section until the two-way communication is established; and
a processor unit which comprises
a receiver which comprises
an image reception section which receives an image transmitted from at least one unit of the image transmitter that has the same communication identifier on a wireless network,
a display section which displays an image transmitted from the image transmitter,
a storage section which stores information on the correspondence relationship between a channel used in transmitting the image from the image transmitter and the transmitted image,
an image selection section which selects one from the transmitted images displayed in thumbnailed form, and
a first display control section which selects a channel used in transmitting an image selected by the image selection section on the basis of information on the correspondence relationship between the channel stored in the storage section and the transmitted image and causes the display section to chronologically display the images transmitted chronologically from the image transmitter via the channel, and
which displays images photographed by the imaging section on the display section.

9. A wireless communication system comprising:
an image transmitter which comprises
an image transmitting section which transmits an image to a receiver that has the same communication identifier on a wireless network,
a second communication control section which establishes two-way communication with the receiver in a one-to-one correspondence, and
a transmission control section which transmits the image intermittently to the image transmitting section until the two-way communication is established; and
a receiver which comprises
an image reception section which receives an image transmitted from at least one image transmitter that has the same communication identifier on a wireless network,
a display section which displays an image transmitted from the image transmitter,
a storage section which stores information on the correspondence relationship between a channel used in transmitting the image from the image transmitter and the transmitted image,
an image selection section which selects one from the transmitted images displayed in thumbnailed form, and
a first display control section which selects a channel used in transmitting an image selected by the image selection section on the basis of information on the correspondence relationship between the channel stored in the storage section and the transmitted image and causes the display section to chronologically display the images transmitted chronologically from the image transmitter via the channel.

10. A wireless communication method comprising:
receiving a plurality of image data items each of which has been assigned with a common communication identifier on a wireless network and a unique communication identifier set for each image transmitter and has been transmitted wirelessly via a different channel and taking in an image data item certified on the basis of the common communication identifier from the image data items;
extracting the unique communication identifier from each of the taken-in image data items, setting a connection identifier based on the unique communication identifier, and storing the image data, the connection identifier, the channel used in communication, and an area where the image data is displayed on a screen in such a manner that the image data and connection identifier are related to the channel and the area;
thumbnailing the stored images and displaying the thumbnailed images on one screen; selecting one of the thumbnailed images; and
not only enlarging the selected image as a main image on the one screen but also connecting a receiver exclusively in two-way communication to the image transmitter that has transmitted the image on the basis of the connection identifier assigned to the image and the channel used to display transmitted images chronologically.

* * * * *